3,396,205
DEHYDROGENATION CATALYSTS CONTAINING BISMUTH COMPOUNDS AND CALCIUM NICKEL PHOSPHATE
Douglas Sadler Alexander, Harvey Minnis, and Brian H. Oliver, Sarnia, Ontario, Canada, assignors to Polymer Corporation Limited, Sarnia, Ontario, Canada, a body corporate
No Drawing. Filed May 13, 1965, Ser. No. 455,599
Claims priority, application Canada, May 20, 1964, 903,079
21 Claims. (Cl. 260—680)

ABSTRACT OF THE DISCLOSURE

A catalyst for the dehydrogenation of hydrocarbon feeds, at elevated temperatures and optionally in presence of oxygen, comprising at least one inorganic bismuth compound supported on a calcium nickel phosphate having a macroporous structure.

---

The present invention relates to improved catalysts for use in the dehydrogenation of certain hydrocarbons and to the use of these catalysts in such dehydrogenation reactions.

The preparation and use as dehydrogenation catalysts of certain calcium nickel phosphates and mixtures of these phosphates with small proportions of chromic oxide have been described in the literature. These catalysts are particularly useful in the dehydrogenation of aliphatic monoolefins having at least four and preferably four to six carbon atoms in their unsaturated carbon chains to form the corresponding conjugated diolefins. In accordance with standard practice, reference herein to the "unsaturated carbon chains" of such monoolefins denote the longest carbon chains which contain the olefinic double bond. They are, for instance, particularly useful in the dehydrogenation of normal butylenes to butadiene-1,3. These catalysts are also useful for the dehydrogenation of alkylated aromatic hydrocarbons containing at least two and preferably two to four carbon atoms in their alkyl groups, such as in the dehydrogenation of ethyl benzene to styrene. These catalysts may also be used in the dehydrogenation of cycloaliphatic olefins having five to eight carbon atoms in their olefinically unsaturated carbon rings and in the dehydrogenation of cycloalkanes having five to seven carbon atoms. Modified dehydrogenation processes have also been described in which these calcium nickel phosphates are used to catalyze the dehydrogenation of paraffinic hydrocarbons having at least three and preferably three to eight carbon atoms, such as in the dehydrogenation of butane, normal and iso-pentane and hexane. These catalysts contain from 7.5 to 9.2, preferably from 8.2 to 9.0 atoms of calcium per atom of nickel. Such calcium nickel phosphate catalysts differ from simple mixtures of calcium phosphate and nickel phosphate since mere admixture of these two salts produces a catalyst which is relatively ineffective in the aforementioned dehydrogenation reactions.

These known calcium nickel phosphate catalysts have been prepared by adding an aqueous solution of calcium and nickel salts, which solution generally contains from 7.5 to 9.2, preferably from 8.2 to 9.0, ions of calcium per ion of nickel, to an aqueous solution of a soluble phosphate while maintaining the resulting mixture in a neutral or preferably alkaline condition. Alternatively, such catalysts have been prepared by adding an aqueous solution of phosphoric acid and the calcium and nickel salts to an aqueous solution of an alkali such as ammonia. Normally, the phosphoric acid or soluble phosphate has been used in slight excess over the amount required to form the normal salt, but they have also been used in the exact proportions theoretically required to form such a salt, or in smaller or considerably greater proportions.

The precipitation of such calcium nickel phosphates has generally been carried out at a pH value of between 7 and 10 and more particularly of between 7.5 and 8.3. Examples of suitable nickel and calcium salts which have been used for preparing these catalysts are calcium and nickel chlorides, nitrates and acetates. Disodium phosphate, trisodium phosphate, dipotassium phosphate and diammonium phosphate are examples of suitable soluble phosphate which may be used in the first of the aforementioned processes for preparing these catalysts. Usually water has been employed as the solvent medium but the use of other aqueous solvents, for example, aqueous alcohol, has been suggested.

In the preparation of these known catalysts, the precipitate is separated from the reaction liquor and washed with water as thoroughly as possible. After washing, the product is dried to give a hard gel which may be crushed or otherwise reduced to granules which may be used directly as a dehydrogenation catalyst. It has, however, been preferred to crush the product to a powder and to prepare pills, tablets or pellets of a suitable size for use as a catalyst. Such pelleting has been effected by treating the powdered product with a lubricant such as graphite, a vegetable oil or a hydrocarbon oil which is subsequently removed by vaporization or oxidation.

One previously proposed method for modifying these catalysts was based on the suggestion that mixture of calcium nickel phosphate with a minor proportion of chromium oxide may be made catalytically active than the calcium nickel phosphate component alone. It has been suggested that the minimum temperature necessary for the catalytic dehydrogenation of olefins using a calcium nickel phosphate which is of itself of high catalytic activity may be lowered in some instances by as much as 100° C. by the admixture therewith of chromium oxide. In most instances, only a small proportion, such as about 2.0%, chromium oxide has been used in admixture with calcium nickel phosphate in order to obtain improved results but chromic oxide has been used in smaller or larger proportions. In general, from 0.5 to 30% by weight of chromic oxide has been preferred. Large proportions of chromium oxide have the disadvantage, however, that they result in a catalyst material which cannot be shaped into active pellets having a sufficiently high mechanical strength and it has, therefore, been more preferred to use from 0.5 to 5% by weight of chromic oxide.

The present invention is based on the discovery that it is possible to obtain active dehydrogenation catalysts using at least one bismuth compound on certain calcium nickel phosphate supports, irrespective of whether or not they contain chromic oxide. Although calcium nickel phosphates are known as dehydrogenation catalysts, it is considered more appropriate to look on them as supports in the catalysts of the present invention since some of the catalysts of the present invention exhibit considerable catalytic activity at temperatures at which the calcium nickel phosphate, even if mixed with chromic oxide, is relatively inactive. When the catalysts of the invention are used at temperatures at which the calcium nickel phosphate itself exhibits dehydrogenation activity, they frequently show improved activity and stability compared to the calcium nickel phosphate itself. The role which the calcium nickel phosphate plays in the catalysts of the invention is however irrelevant to the definition or scope of the present invention.

The calcium nickel phosphate supports which can be used to prepare dehydrogenation catalysts in accordance with the present invention are those in which at least 60% of the total pore volume of the calcium nickel phosphate is contributed by pores having diameters in the range of from 1000 to 8000 Angstrom units (A.). The calcium nickel phosphate supports used in the catalysts of the invention preferably have at least 80% of their total pore volume contributed by pores having diameters in the range of from 1000 to 8000 A., and more preferably have at least 90% of their total pore volume contributed by pores having diameters in the range of from 2000 to 6000 A.

The extent to which the bismuth compound or compounds may be used on the calcium nickel phosphate support will depend on the natures of the bismuth compound and the support and on the particular hydrocarbon dehydrogenation process in which it is intended to use the resulting catalyst. The amount of bismuth compound used also depends to some extent on the procedure adopted for incorporating it into the catalyst. Useful catalysts have been obtained with amounts as small as 2% and as large as 75% by weight based on the total catalyst composition. In general, the bismuth compounds are incorporated to the extent of from 1 to 80% by weight based on the total catalyst composition.

The method by which the bismuth compound or compounds are incorporated in the calcium nickel phosphate support will also depend upon the natures of the bismuth compound or compounds and the support. In many cases, it has proved satisfactory to form the catalysts by simple dry mixing of the bismuth compound or compounds with the calcium nickel phosphate. Alternatively, when the latter is prepared in a wet form, the mixing may be effected prior to drying the components. In the case of catalysts prepared by simple admixture of the bismuth compound with the calcium nickel phosphate, it is preferred to use the bismuth compound or compounds to the extent of from about 1 to about 80% and more preferably to the extent of from about 5 to about 60% by weight based on the total catalyst composition. In the case of incorporation by simple admixture, particularly satisfactory results have been obtained by the use of bismuth oxide or of a compound capable of forming a bismuth oxide under the hydrocarbon dehydrogenation process conditions. Such bismuth oxide formation may also occur during the regeneration operation described below. Examples of preferred bismuth compounds for use in the catalysts of the present invention are bismuth oxide, bismuth hydroxide, bismuth chloride, bismuth phosphate, bismuth sulfate, bismuth phosphomolybdate and bismuth phosphotungstate.

It is also possible to incorporate the bismuth compound or compounds by coprecipitation with the calcium nickel phosphate. In this particular preparation, the bismuth compound and the calcium nickel phosphate support may be coprecipitated from a solution containing calcium ions, nickel ions, phosphate ions and bismuth ions. Such a process is carried out generally as described above for the preparation of calcium nickel phosphate except that additional phosphoric acid is used in the amount required to form bismuth phosphate. In the case of catalysts containing a coprecipitated bismuth compound, up to 5% by weight of the latter is normally used.

The catalysts of the present invention derive their activity, at least in part, from the presence therein of a bismuth compound. It was previously known that bismuth compounds could be used for stabilizing catalyst materials which, in themselves, had dehydrogenating activity, for example, small proportions of bismuth oxide have been incorporated as stabilizers in dehydrogenation catalysts comprising iron oxide, chromium oxide and a potassium compound. It is also known to use compounds containing both bismuth and other metals such as molybdenum and tungsten, for example, bismuth tungstate, bismuth molybdate, bismuth phosphotungstate and bismuth phosphomolybdate, either as such or on inert supports, as hydrocarbon oxidation catalysts but these catalysts were reported to require the presence of molecular oxygen to be effective. The presence of molecular oxygen was also reported to be required to obtain useful hydrocarbon oxidation activity unsupported bismuth compounds which also has the disadvantage that pellets of such unsupported bismuth compounds shrink during use and rapidly lose their activity. It has also been reported that other bismuth compounds, particularly bismuth oxide, have, in themselves or on inert supports, no dehydrogenating activity.

The catalysts of the present invention are generally effective for prolonged operation, irrespective of whether or not molecular oxygen is present, using any bismuth compound.

If desired, the catalysts of the invention may be modified for particular applications by the incorporation of other active or inactive materials. The incorporation of chromic oxide has already been mentioned.

The catalysts of the present invention can be used in any conventional dehydrogenation reactions but are particularly useful in the dehydrogenation both in the absence and the presence of molecular oxygen, of at least one hydrocarbon selected from aliphatic monoolefins having at least four and preferably four to six carbon atoms in their unsaturated carbon chains, alkylated aromatic hydrocarbons having at least two and preferably two to four carbon atoms in their alkyl groups, cycloaliphatic olefins having five to eight carbon atoms in their olefinically unsaturated rings and cycloalkanes having five to seven carbon atoms. In accordance with standard practice, references herein to the "unsaturated carbon chains" of a monoolefin denote the longest carbon chain which contains the olefinic double bond.

The catalysts of the present invention are especially useful for the dehydrogenation of butene-1 and/or butene-2 to butadiene, of isoamylene to isoprene, and of ethyl benzene to styrene. They can also be applied to the dehydrogenation of a mixed olefin feed stock such as a mixture of n-butene and isoamylene.

The catalysts of the present invention are also useful for the dehydrogenation, in the presence of molecular oxygen, of paraffinic hydrocarbons containing at least three and preferably three to eight carbon atoms, particularly for the dehydrogenation of butane to butenes and butadiene.

Hydrocarbon dehydrogenation reactions using the novel catalysts of the invention are preferably carried out at elevated temperature in the presence of steam. It should be noted that these reactions must not be effected at a temperature at which the pore size distribution of the calcium nickel phosphate would deviate substantially from the limitations set down above. It should also be noted that the calcium nickel phosphate supports may only conform to the pore size distribution requirements after they have been heated to an elevated temperature. Since the pore size limitations apply to the calcium nickel phosphate itself, the temperature to which any such catalyst should be heated will first be determined on a separate sample before the incorporation of the bismuth compound or compounds even though the actual heating will be effected on the whole catalyst composition. It must be stressed that the pore size limitations apply to the calcium nickel phosphate after any heat treatment and not to the whole catalyst composition which will generally have a completely different pore size distribution.

Dehydrogenation reactions using the novel catalyst of the invention are generally carried out at temperatures between 500° C. and 750° C. or at temperatures not greatly outside this range. Such dehydrogenation is preferably effected at temperatures between 500 and 650° C.

As previously stated, the dehydrogenation reaction is preferably carried out in the presence of steam and the amount of steam is generally between 5 and 40, preferably between 10 and 25, volumes per volume of hydrocarbon although smaller or larger proportions may be used if desired.

Except for the foregoing limitations, the hydrocarbon dehydrogenation conditions may be varied widely. For instance, the method is operable at widely varying flow rates, although the rates of flow should, of course, be sufficient to avoid excessive decomposition of the dehydrogenated product.

For fixed bed operation, the catalyst of the present invention are preferably used in the form of pills, tablets or pellets of a suitable size and such pellets may be formed from a powdered material by admixture with a lubricant such as graphite, a vegetable oil or a hydrocarbon oil which may subsequently be removed by vaporization or oxidation. To prepare these new catalysts for use in hydrocarbon dehydrogenation process, the reaction chamber is charged with the granular catalysts and the lubricant, if used, is "burnt off" by passing air or preferably a mixture of up to about 50% air with steam, through the catalyst bed at an elevated temperature. When the lubricant used for preparing the catalyst pellets is a substance capable of being vaporized, e.g. a mineral oil or vegetable oil, the burn-off treatment with air and steam may be preceded by one of passing an inert gas such as steam, nitrogen or carbon dioxide over the catalyst at a temperature of from 200–600° C. so as to vaporize at least a portion of the binding agent from the catalyst granules. Obviously, steam will not be passed through the catalyst bed until the temperature of the latter exceeds the temperature at which the steam would condense thereon. As previously indicated, the desired pore size distribution may only be obtained after the catalyst composition has been heated. The necessary modification of the pore size distribution may, therefore, be effected during the lubricant removal operation or in a separate heat treatment operation following the lubricant-removal operation.

After freeing the catalyst of the lubricant, the catalyst bed is generally swept free of air with steam and is heated to the desired reaction temperature, preferably by passing superheated steam through the bed. The mixture of steam and the hydrocarbon feed, optionally with oxygen, is then passed through the catalyst bed at the desired temperature. The usual procedure is tot pass the hydrocarbon feed into admixture with steam which has been superheated to a temperature sufficient for the reactant mixture to be at the desired reaction temperature, and to pass the resulting mixture through the catalyst bed. However, the heat may be supplied in other ways. The vapours issuing from the catalyst chamber are ordinarily passed through heat exchangers and through cooling devices, first to condense the steam and then to separate the product.

During use in hydrocarbon dehydrogenation reactions, the catalysts of the present invention may gradually accumulate a small amount of carbon or non-volatile organic material and consequently lose their catalytic activity. To regenerate such catalysts, the flow of hydrocarbon starting material is periodically interrupted and air mixed with steam is blown through the catalyst bed at a suitable elevated temperature, for example, at a temperature between 500 and 750° C., to oxidize and remove the carbonaceous or organic material. The duration of the catalyst regeneration period is related to the duration of the preceding dehydrogenation period. In general, the catalysts will be used in a cyclic operation comprising alternate dehydrogenation and regeneration operations.

In general, the catalyst will not be heated at such a temperature in any of the operating stages, i.e. the lubricant-removal operation, any separate heat treatment operation, the actual dehydrogenation operation and the regeneration treatment, that the calcium nickel phosphate support would deviate from the required pore size distribution. In addition, it is undesirable to heat the catalysts to such a temperature that the bismuth compound or compounds melt or are converted to bismuth metal. In the case of bismuth oxide-containing catalysts, temperatures greater than about 820° C. will not normally be used.

The invention will now be illustrated in the following examples in which, unless otherwise stated, all parts and percentages are by weight. The catalysts of Example 1 are conventional calcium nickel phosphates and this example is included solely for comparison purposes.

Example 1

Six litres of an aqueous solution containing 462 g./litre of calcium chloride were filtered and mixed with 1.5 litres of a filtered aqueous solution containing 360 g./litre of nickelous nitrate; this corresponds to a Ca:Ni atomic ratio of 8.5:1. To this solution, there were then added 2333 g. of 85% orthophosphoric acid, thereby giving approximately 8.7% excess phosphoric acid over the amount which would be stoichiometrically required to form calcium phosphate and nickelous phosphate. The solution was then made up to 12.0 litres with distilled water. This stock solution was then fed at the rate of 5.5 ml. per minute into a 600 ml. beaker where it was diluted with water and from which it was fed, after dilution, into a glass reaction vessel at the rate of 134 ml. per minute, the reaction vessel having a capacity of 15 litres, being maintained at a temperature of 25° C., and being fitted with a propeller type mixer and baffles for producing turbulence.

An aqueous ammonium hydroxide solution containing 14% w./v. $NH_3$ was fed into the reaction vessel so that the pH of the agitated mixture was maintained at a value between 7.7 and 8.0.

The resulting slurry was agitated and allowed to overflow from the reaction vessel and to run to waste until steady state conditions were established. The overflowing slurry was collected in a settling tank for a period of 16 hours and then allowed to settle in contact with the precipitation mother liquor for a further period of 24 hours, after which the mother liquor was decanted from the settling tank and the settled slurry was filtered and washed with distilled water. The washed filter cake was then mulled for one half hour without any heating and then for a few minutes with four litres of distilled water. The resulting slurry was then refiltered and washed with distilled water. The washing treatment comprising the mulling, filtering and washing operations was repeated until the filtrate was free of chloride ions on testing with aqueous silver nitrate solution. The filter residue was then returned to the muller where it is partially dried for a period of 1½ hours with a 15 p.s.i.g. steam pressure. The partially dried material was then transferred to trays and dried overnight in an oven at 65° C. The oven temperature was then increased to 300° C. and the drying operation was terminated three hours after the commencement of the oven temperature rise from 65° C.

After removal from the oven, the material was ground by hand to pass through a Tyler Standard 10 mesh sieve and then thoroughly mixed by hand with a mixture of 2% graphite and 2% chromic oxide. This mixture was then formed into cylindrical pellets of 3/16" diameter and 3/16" length and having shallow convex ends.

The removal of the graphite was effected by passing a mixture of steam and air over approximately 23 g. of pellets at the following flow rates for 16 hours at 650° C.:

| | Ml./minute |
|---|---|
| Steam (calculated at room temperature and pressure) | 2000 |
| Air (measured at room temperature and pressure) | 100 |

After the removal of the graphite, the catalytic activity of the pellets for the dehydrogenation of butene-1 was determined at the temperatures specified in Table 1. The activity determinations were effected using mixtures of steam and butene-1 in the approximate relative proportion of 20 volumes of steam per volume of hydrocarbon. The dehydrogenation product was analyzed by gas chromatography, no account being taken of the formation of carbonyls or coke.

The "percent conversion" (percent C) as expressed by 100 times the number of moles butene-1 converted divided by the total number of moles of butene-1 in the feed, the "percent selectivity" (percent S) as expressed by 100 times the number of moles of butene-1 converted to butadiene, divided by the total number of moles of butene-1 reacted, and the "percent yield" (percent Y) as expressed by the product of the "percent conversion" and the "percent selectivity" were calculated. Several tests were made and the results obtained are given in Table 1, the mean values being approximated to the nearest whole number.

It will be seen that 99.6% of the total pore volume was contributed by pores having diameters within the range of from 1000 to 8000 A. and that 97.1% of the total pore volume was contributed by pores having diameters within the range of from 2000 to 6000 A.

Example 2

A calcium nickel phosphate was prepared as described for Tests Nos. 1–8 in Example 1 except that varying pro- TABLE 1.—NON-OXIDATIVE DEHYDROGENATION OF BUTENE-1 USING CALCIUM NICKEL PHOSPHATE PELLETS

| Test No. | Dehydrogenation temperature (percent) | | | | | | | | | | | | | | |
|---|---|---|---|---|---|---|---|---|---|---|---|---|---|---|---|
| | 530° C. | | | 550° C. | | | 600° C. | | | 625° C. | | | 650° C. | | |
| | C | S | Y | C | S | Y | C | S | Y | C | S | Y | C | S | Y |
| 1 | | | | | | | 41.8 | 92.0 | 38.5 | | | | 63.2 | 87.5 | 55.3 |
| 2 | | | | 17.8 | 95.0 | 16.9 | 43.0 | 92.0 | 39.6 | | | | 67.3 | 84.3 | 56.7 |
| 3 | 14.0 | 97.0 | 14 | | | | 45.4 | 92.9 | 42.2 | | | | 66.5 | 87.6 | 58.3 |
| 4 | | | | | | | 44.0 | 92.0 | 40.5 | 56.5 | 88.3 | 49.9 | | | |
| 5 | | | | 20.0 | 94.4 | 18.9 | 39.1 | 95.6 | 37.4 | 47.4 | 94.8 | 44.9 | 57.5 | 93.5 | 53.8 |
| 6 | | | | | | | 40.2 | 89.4 | 35.9 | | | | | | |
| 7 | | | | | | | 37.6 | 93.1 | 35.0 | 47.7 | 93.1 | 44.4 | 57.2 | 91.6 | 52.4 |
| 8 | | | | | | | | | | | | | | | |
| Means | 14 | 97 | 14 | 19 | 95 | 18 | 42 | 92 | 38 | 51 | 92 | 46 | 62 | 89 | 55 |

A further series of activity determinations was made in the same manner except that 50% by volume of free oxygen based on the butene-1 was added to the feed. The mean results of several determinations are given in Table 2.

TABLE 2.—OXIDATIVE DEHYDROGENATION (50% V/V O$_2$) OF BUTENE-1 USING CALCIUM NICKEL PHOSPHATE PELLETS

| Test No. | Dehydrogenation temperature (percent) | | | | | | | | | | | |
|---|---|---|---|---|---|---|---|---|---|---|---|---|
| | 550° C. | | | 600° C. | | | 625° C. | | | 650° C. | | |
| | C | S | Y | C | S | Y | C | S | Y | C | S | Y |
| 9 | 37 | 87 | 32 | 54 | 86 | 46 | 63 | 87 | 55 | 71 | 85 | 61 | portions of bismuth oxide were added to the catalyst material together with the graphite and the 2% chromic oxide, the proportion of the chromic oxide being based on the total weight of the calcium nickel phosphate and the bismuth oxide. The activities of these catalysts were determined exactly as described in Example 1 after removal of the graphite for 16 hours at 650° C., no oxygen being added to the feed. The detailed results together with their mean values are given in Table 4 in which these mean results are compared with the corresponding values for unmodified calcium nickel phosphate.

TABLE 4.—NON-OXIDATIVE DEHYDROGENATION OF BUTENE-1 USING CALCIUM NICKEL PHOSPHATE (CNP)/BISMUTH OXIDE CATALYSTS

| Test No. | Catalyst Composition | | | Dehydrogenation temperature (percent) | | | | | | | | | | | |
|---|---|---|---|---|---|---|---|---|---|---|---|---|---|---|---|
| | Bi$_2$O$_3$ | CNP | Cr$_2$O$_3$ | 530° C. | | | 550° C. | | | 600° C. | | | 650° C. | | |
| | | | | C | S | Y | C | S | Y | C | S | Y | C | S | Y |
| 10 | 15 | 85 | 2 | 53.1 | 95.4 | 50.7 | | | | | | | | | |
| 11 | 15 | 85 | 2 | 48.0 | 87.5 | 46.8 | 63.0 | 95.3 | 60.0 | | | | | | |
| 12 | 25 | 75 | 2 | 61.0 | 94.6 | 57.7 | 72.0 | 94.2 | 67.8 | | | | | | |
| 13 | 50 | 50 | 2 | | | | | | | 55.9 | 87.3 | 48.8 | 72.0 | 82.9 | 59.7 |
| 14 | 50 | 50 | 2 | | | | | | | 64.7 | 85.6 | 55.4 | | | |
| 15 | 50 | 50 | 2 | | | | | | | | | | 80.0 | 77.5 | 62.0 |
| 16 | 50 | 50 | 2 | | | | | | | 59.2 | 89.0 | 52.7 | | | |
| Means | 0 | 100 | 2 | 14 | 97 | 14 | 19 | 95 | 18 | 42 | 92 | 38 | 62 | 89 | 55 |
| Means | 15 | 85 | 2 | 51 | 96 | 49 | 63 | 95 | 60 | | | | | | |
| Means | 25 | 75 | 2 | 61 | 95 | 58 | 72 | 94 | 68 | | | | | | |
| Means | 50 | 50 | 2 | | | | | | | 60 | 87 | 52 | 76 | 80 | 61 |

The pore size distribution of a composite sample of the pellets after the lubricant-removal operation was determined by the mercury penetration method (Ritter, H. L. and Drake, L. C., Ind. and Eng. Chem., Anal. Ed., 17, No. 12, 782–786, 1945) and the pore size results given in Table 3 were obtained with a maximum mercury pressure of 3000 p.s.i.

TABLE 3.—PORE SIZE DISTRIBUTION OF CALCIUM NICKEL PHOSPHATE PELLETS

| Test Nos. | Pore size distribution (percentage of total pore volume from pores specified diameters) | | | | | | | |
|---|---|---|---|---|---|---|---|---|
| | 1,000–2,000 A. | 2,000–3,000 A. | 3,000–4,000 A. | 4,000–5,000 A. | 5,000–6,000 A. | 6,000–7,000 A. | 7,000–8,000 A. | >8,000 A. |
| 1–9 | 1.4 | 46.7 | 46.0 | 3.7 | 0.7 | 0.7 | 0.4 | 0.4 |

These results indicate the substantial improvement in catalytic activity which it is possible to obtain by the incorporation of bismuth oxide in calcium nickel phosphate. It will also be seen that the catalysts of the present invention exhibit substantial activity at temperatures at which calcium nickel phosphate is relatively inactive, i.e. at or below 550° C.

The graphite-removal operation was effected on two further samples of calcium nickel phosphate (containing no bismuth oxide) for 16 hours at 593° C. and for 16 hours at 802° C. respectively and, under the same two sets of conditions, on catalysts comprising 50 parts calcium nickel phosphate, 50 parts bismuth oxide and 2 parts chromic oxide. Pore size distribution determinations were made by the mercury penetration method on each of the bismuth-free samples after the graphite-removal operations. The results obtained are given in Table 5 where they are compared with those given in Example 1.

TABLE 5.—PORE SIZE DISTRIBUTIONS OF CALCIUM NICKEL PHOSPHATE PELLETS AFTER VARIOUS GRAPHITE-REMOVAL OPERATIONS

| Tests Nos. | Graphite-removal conditions | | Pore size distribution (percentage of total pore volume from pores of specified diameters) | | | | | | | | | | | |
|---|---|---|---|---|---|---|---|---|---|---|---|---|---|---|
| | Hrs. | °C. | <1,000 A. | 1,000–2,000 A. | 2,000–3,000 A. | 3,000–4,000 A. | 4,000–5,000 A. | 5,000–6,000 A. | 6,000–7,000 A. | 7,000–8,000 A. | 8,000–9,000 A. | 9,000–10,000 A. | >10,000 A. | 1,000–8,000 A. | 2,000–6,000 A. |
| 17 | 16 | 593 | 39.7 | 47.9 | 8.3 | 8.3 | 0.4 | 0.4 | 0.4 | 0.4 | 3.3 | 3.3 | 3.3 | 57.0 | 8.7 |
| 1–9 | 16 | 650 | 0 | 1.4 | 46.7 | 46.0 | 3.7 | 0.7 | 0.7 | 0.4 | 0.4 | 0.4 | 0.4 | 99.6 | 97.1 |
| 18 | 16 | 802 | 0 | 0 | 1.4 | 1.4 | 2.8 | 12.9 | 27.9 | 25.0 | 27.2 | 2.8 | 2.8 | 70.0 | 17.1 |

The catalytic activities in non-oxidative butene dehydrogenation were determined as generally described in Example 1 on the bismuth oxide/calcium nickel phosphate catalysts which had been given the same graphite-removal treatments. The results obtained are compared in Table 6 in which there are also given the pore size distributions from Table 5 of the bismuth-free calcium nickel phosphate supports which had been given the corresponding graphite-removal treatments.

A further advantage shown by some of the catalysts of the present invention compared to unmodified calcium nickel phosphate catalysts is that their use results in a substantial reduction in the amount of free hydrogen present in the dehydrogenated product stream, with consequent simplification and reduction in the cost of separating the dehydrogenated product. For instance, in the non-oxidative dehydrogenation of butene-1 at 600° C. (Tests Nos. 1–8) a catalyst comprising 100 parts calcium TABLE 6.—NON-OXIDATIVE DEHYDROGENATION OF BUTENE-1 USING CATALYSTS COMPRISING 50 PARTS CALCIUM NICKEL PHOSPHATE, 50 PARTS BISMUTH OXIDE AND 2 PARTS CHROMIC OXIDE AFTER VARIOUS GRAPHITE-REMOVAL OPERATIONS

| Tests Nos. | Graphite-removal conditions | | Pore size [1] (diameter) distribution (percent) | | Temperature of dehydrogenation activity determinations (percent) | | | | | | | | |
|---|---|---|---|---|---|---|---|---|---|---|---|---|---|
| | | | | | 580° C. | | | 600° C. | | | 620° C. | | |
| | Hrs. | °C. | 1,000–8,000 A. | 2,000–6,000 A. | C | S | Y | C | S | Y | C | S | Y |
| 19 | 16 | 593 | 57.0 | 8.7 | 58.6 | 82.7 | 48.5 | 59.6 | 81.4 | 48.5 | 60.9 | 78.6 | 47.9 |
| 14 | 16 | 650 | 99.6 | 97.1 | 61.3 | 76.0 | 46.6 | 64.7 | 85.6 | 55.4 | 69.6 | 84.5 | 58.8 |
| 20 | 16 | 802 | 70.0 | 17.1 | 35.5 | 72.9 | 25.9 | 43.2 | 73.6 | 31.8 | 63.5 | 72.0 | 38.5 |

[1] The pore size distribution results are quoted from Table 5 and apply to the bismuth-free calcium nickel phosphate supports after the graphite-removal operations.

It should be noted that Test No. 19 (graphite-removal for 16 hours at 593° C.) gave satisfactory dehydrogenation activity. The catalyst was, however, unstable, metallic bismuth being formed on the surface of the catalyst pellets during use. As a result of this instability, the catalyst is considered to be unsuitable for use in dehydrogenation. It should further be noted that the corresponding bismuth-free calcium nickel phosphate support had only 57% of its total pore volume contributed by pores with diameters in the range of from 1000 to 8000 A. and that the catalyst would not, therefore, be within the scope of the present invention.

The catalysts of Tests Nos. 14 and 20 showed no signs of metallic bismuth on the pellets after use. In the case of Test No. 14, the catalyst had high dehydrogenation activity (55% yield compared to 38% for unmodified calcium nickel phosphate at the same temperature). The corresponding bismuth-free support had 99.6% of its total pore volume contributed by pores with diameters in the range of from 1000 to 8000 A. and 97.1% of its total pore volume contributed by pores with diameters in the range of from 2000 to 6000 A. This pore size distribution is clearly within the broad range identifying the supports for the catalysts of the present invention (at least 60% of the total pore volume contributed by pores with diameters in the range from 1000 to 8000 A.). It is, furthermore, within the more preferred range (at least 90% of the total pore volume contributed by pores with diameters in the range of from 2000 to 6000 A.) for the supports of the invention.

In the case of Test No. 20, the catalyst showed a moderate dehydrogenation activity with satisfactory stability and it should be noted that the corresponding support complied with the broad pore size distribution requirement for the catalysts of the present invention in having 70.0%, the requirement being that at least 60%, of its total pore volume contributed by pores with diameters in the range of 1000 to 8000 A. It did not, however, comply with the preferred and more preferred requirements insofar as it did not have at least 80% of its total pore volume contributed by pores with diameters in the range of from 1000 to 8000 A. or at least 90% of its total pore volume contributed by pores with diameters in the range of 2000 to 6000 A.

nickel phosphate and 2 parts of chromic oxide gave a product stream containing about 30% v./v. free hydrogen whereas the bismuth oxide/calcium nickel phosphate catalyst of Test No. 13 gave a product stream containing only 0.2% free hydrogen.

Example 3

Two catalysts were prepared as for Tests Nos. 1 to 8 in Example 1 except that, in one, 92.6 g. of bismuth nitrate pentahydrate were added to the stock solution in order to give a product containing 1.9% bismuth, calculated as bismuth phosphate, based on the total weight of the catalyst material excluding the $Cr_2O_3$ and, in the other, 115.3 g. of bismuth nitrate pentahydrate were added to the stock solution in order to give a product containing 2.4% bismuth, expressed as bismuth phosphate based on the total weight of the catalyst material excluding the $Cr_2O_3$. The quantities of 85% orthophosphoric acid added to the two solutions were increased to 2355 g. and to 2361 g. respectively so as to maintain the excess phosphoric acid levels at 8.7% based on the weights of the products excluding the bismuth salts.

The activities of these catalysts were determined as described in Example 1 in a non-oxidative system after graphite-removal for 16 hours at 650° C. The results given in Table 7 were obtained. The corresponding values for unmodified calcium nickel phosphate are also given in Table 7.

TABLE 7.—NON-OXIDATIVE DEHYDROGENATION AT 600° C. OF BUTENE-1 USING COPRECIPITATED CALCIUM NICKEL PHOSPHATE (CNP)/BISMUTH PHOSPHATE CATALYSTS

| Test No. | Catalyst Composition | | | Temperature, 600°C. | | |
|---|---|---|---|---|---|---|
| | CNP | $BiPO_4$ | $Cr_2O_3$ | Percent C | Percent S | Percent Y |
| 21 | 98.1 | 1.9 | 2.0 | 53.3 | 90.0 | 48.0 |
| 22 | 97.6 | 2.4 | 2.0 | 63.1 | 80.7 | 50.9 |
| Means | 100 | 0 | 2 | 42 | 92 | 38 |

These results illustrate the considerable increase in activity which it is possible to obtain by the coprecipitation with the calcium nickel phosphate of a relatively small proportion of a bismuth compound. A catalyst containing 1% coprecipitated bismuth phosphate was also evaluated, in the manner generally described in Example 1, in the oxidative dehydrogenation of butane using 15% by volume of free oxygen based on the butane in the feed, and a conversion of 18% at a selectivity, calculated on the basis of the butadiene produced, of 71%, was obtained at a temperature of 640° C.

Example 4

Another catalyst was prepared using the calcium nickel phosphate of Tests Nos. 1 to 8 in Example 1, by mixing 50 parts of the calcium nickel phosphate with 50 parts of bismuth phosphate, the 2 parts of graphite and the 2 parts of chromic oxide. The activity of this modified catalyst was determined generally as described in Example 1 with 50% by volume of free oxygne based on the butene-1 in the feed, the graphite-removal operation having been effected for 16 hours at 650° C. The results obtained are given in Table 8 in which they are compared with the corresponding mean values for unmodified calcium nickel phosphate.

as active at 600° C. in oxidative dehydrogenation as unmodified calcium nickel phosphate, such catalysts have the same orders of activity at higher temperatures.

Example 5

A further catalyst was prepared using the calcium nickel phosphate of Tests Nos. 1 to 8 in Example 1 by mixing 50 parts of the calcium nickel phosphate with 50 parts of bismuth phosphomolybdate (Bi:P:Mo=12:1:12)

the 2 parts of graphite and the 2 parts of chromic oxide. The activity of this catalyst was determined generally as described in Example 1 for the non-oxidative procedure and for the oxidative procedures with a feed containing 50% by volume of free oxygen, the graphite-removal having been effected for 16 hours at 650° C.

TABLE 8.—OXIDATIVE DEHYDROGENATION (50% V./V. O₂) OF BUTENE-1 USING A CALCIUM NICKEL PHOSPHATE (CNP) BISMUTH PHOSPHATE CATALYST

| Test No. | Catalyst Composition | | | Dehydrogenation Temperature (percent) | | | | | | | | |
|---|---|---|---|---|---|---|---|---|---|---|---|---|
| | | | | 600° C. | | | 625° C. | | | 650° C. | | |
| | CNP | BiPO₄ | Cr₂O₃ | C | S | Y | C | S | Y | C | S | Y |
| 23 | 50 | 50 | 2 | 46.7 | 88.3 | 41.2 | 66.7 | 89.1 | 59.4 | 71.7 | 89.1 | 63.9 |
| Means | 100 | 0 | 2 | 54 | 86 | 46 | 63 | 87 | 55 | 71 | 85 | 61 |

It will be seen that, although the 50/50 mixture of bismuth phosphate with calcium nickel phopshate is not The results obtained are given in Tables 9 and 10, in which the corresponding mean results for unmodified calcium nickel phosphate are also given.

TABLE 9.—NON-OXIDATIVE DEHYDROGENATION OF BUTENE-1 USING A CALCIUM NICKEL PHOSPHATE (CNP)/BISMUTH PHOSPHOMOLYBDATE (BPM) CATALYST

| Test No. | Catalyst Composition | | | Dehydrogenation temperature (percent) | | | | | | | | | | | |
|---|---|---|---|---|---|---|---|---|---|---|---|---|---|---|---|
| | | | | 550° C. | | | 600° C. | | | 625° C. | | | 650° C. | | |
| | CNP | BPM | Cr₂O₃ | C | S | Y | C | S | Y | C | S | Y | C | S | Y |
| 24 | 50 | 50 | 2 | | | | 52.7 | 93.1 | 49.1 | | | | 69.9 | 84.9 | 59.3 |
| 25 | 50 | 50 | 2 | | | | 60.2 | 92.3 | 55.6 | | | | 72.0 | 81.8 | 58.9 |
| 26 | 50 | 50 | 2 | | | | 52.4 | 92.9 | 48.7 | | | | 68.2 | 79.3 | 54.1 |
| 27 | 50 | 50 | 2 | | | | | | | | | | 69.7 | 85.3 | 59.5 |
| 28 | 50 | 50 | 2 | | | | 75.1 | 91.6 | 68.8 | | | | | | |
| 29 | 50 | 50 | 2 | 51.4 | 96.8 | 49.8 | 69.0 | 92.4 | 63.8 | 75.0 | 88.4 | 66.3 | | | |
| Means | 50 | 50 | 2 | 51 | 97 | 50 | 62 | 92 | 57 | 75 | 88 | 66 | 70 | 83 | 58 |
| Means | 100 | 0 | 2 | 19 | 95 | 18 | 42 | 92 | 38 | 51 | 92 | 46 | 62 | 89 | 55 |

TABLE 10.—OXIDATIVE DEHYDROGENATION (50% V./V. O₂) OF BUTENE-1 USING A CALCIUM NICKEL PHOSPHATE (CNP) BISMUTH PHOSPHOMOLYBDATE (BPM) CATALYST

| Test No. | Catalyst Composition | | | Dehydrogenation temperature (percent) | | | | | | | | |
|---|---|---|---|---|---|---|---|---|---|---|---|---|
| | | | | 550° C. | | | 600° C. | | | 650° C. | | |
| | CNP | BPM | Cr₂O₃ | C | S | Y | C | S | Y | C | S | Y |
| 30 | 50 | 50 | 2 | 63.1 | 91.2 | 57.5 | | | | | | |
| 31 | 50 | 50 | 2 | | | | 78.5 | 86.4 | 67.8 | | | |
| 32 | 50 | 50 | 2 | | | | | | | 88.4 | 73.9 | 65.3 |
| Means | 50 | 50 | 2 | 63 | 91 | 58 | 78 | 86 | 68 | 88 | 74 | 65 |
| Means | 100 | 0 | 2 | 37 | 87 | 32 | 54 | 86 | 46 | 71 | 85 | 61 |

From Tables 9 and 10, it will be seen that a considerable increase in activity in both the oxidative and the non-oxidative systems results from the incorporation of bismuth phosphomolybdate and that the catalysts of the invention show high activity at 550° C., at which temperature the unmodified calcium nickel phosphate is relatively inactive.

A sample of this 50/50 calcium nickel phosphate/bismuth phosphomolybdate catalyst was also evaluated in a continuous cyclic nonoxidative butene-1 dehydrogenation process, each cycle comprising alternating 5 minute dehydrogenation and 5 minute regeneration steps, the regeneration being effected with a mixture of 420 v./v./hr. air and 2300 v./v./hr. steam. After 49 days continuous operation, the catalyst showed the following activity at 530° C.

TEST NO. 33

| | Percent |
|---|---|
| Conversion | 51.1 |
| Selectivity | 89.1 |
| Yield | 45.5 |

A further catalyst containing 25% bismuth phosphomolybdate and 75% calcium nickel phosphate was prepared in the same manner and evaluated in the continuous cyclic operation described above for 16 days. Some results obtained during this operation are given in Table 11.

TABLE 11.—CONTINUOUS NON-OXIDATIVE DEHYDROGENATION OF BUTENE-1 USING A BISMUTH PHOSPHOMOLYBDATE (BPM)/CALCIUM NICKEL PHOSPHATE (CNP) CATALYST

| Test No. | Catalyst Composition | | | Days of Operation | Dehydrogenation Temperature, °C | Activity, percent | | |
|---|---|---|---|---|---|---|---|---|
| | CNP | BPM | Cr₂O₃ | | | C | S | Y |
| 34 | 75 | 25 | 2 | 9 | 560 | 55.9 | 91.9 | 50.9 |
| 35 | 75 | 25 | 2 | 11 | 565 | 56.6 | 91.9 | 52.0 |
| 36 | 75 | 25 | 2 | 16 | 575 | 50.5 | 92.4 | 46.7 |

From the results of Tests Nos. 33–36, it will be seen that the catalyst of the invention has activity for extended periods of use. A catalyst comprising unsupported 100% bismuth phosphomolybdate underwent considerable shrinkage during the graphite-removal operation whilst the catalysts of the invention showed no such thermal instability as indicated by the above prolonged test results.

Example 6

A further catalyst was prepared using the calcium nickel phosphate of Tests Nos. 1 to 8 in Example 1 by mixing 50 parts of the calcium nickel phosphate with 50 parts of bismuth phosphotungstate (Bi:P:W=12:1:12), the two parts of graphite and the two parts of chromic oxide. The activity of this catalyst was determined generally as described in Example 1 with a feed containing 50% by volume of free oxygen, the graphite-removal having been effected for 16 hours at 650° C.

The results obtained are given in Table 12 in which the corresponding mean results for unmodified calcium nickel phosphate are also given.

mixing 50 parts of the calcium nickel phosphate with 50 parts of bismuth hydroxide, the two parts of graphite and the two parts of chromic oxide. A second catalyst was prepared by pelleting a mixture of 100 parts of bismuth hydroxide and 2 parts of graphite.

The activities of these catalysts were determined generally as described in Example 1 both in the absence of oxygen and in the presence of oxygen and the results obtained are shown in Tables 13 and 14, in which they are compared with those obtained with unmodified calcium nickel phosphate. The oxidative results were obtained with the addition to the feed of 25% by volume of free oxygen based on the butene-1.

TABLE 13.—NON-OXIDATIVE DEHYDROGENATION OF BUTENE-1 USING BISMUTH HYDROXIDE-CONTAINING CATALYSTS

| Test No. | Catalyst Composition | | | Dehydrogenation temperature, (percent) | | | | | |
|---|---|---|---|---|---|---|---|---|---|
| | | | | 600° C. | | | 650° C. | | |
| | CNP | Bi(OH)₃ | Cr₂O₃ | C | S | Y | C | S | Y |
| 41 | 0 | 100 | 0 | 8 | 63 | 5.0 | | | |
| 42 | 50 | 50 | 2 | 59.6 | 89.5 | 53.3 | 74.3 | 85.6 | 63.6 |
| Means | 100 | 0 | 2 | 42 | 92 | 38 | 62 | 89 | 55 |

TABLE 14.—OXIDATIVE DEHYDROGENATION (25% V./V. O₂) OF BUTENE-1 USING A CALCIUM NICKEL PHOSPHATE (CNP)/BISMUTH HYDROXIDE CATALYST

| Test No. | Catalyst Composition | | | Dehydrogenation temperature, (percent) | | | | | |
|---|---|---|---|---|---|---|---|---|---|
| | | | | 600° C. | | | 650° C. | | |
| | CNP | Bi(OH)₃ | Cr₂O₃ | C | S | Y | C | S | Y |
| 43 | 50 | 50 | 2 | 62.6 | 84.8 | 53.1 | 78.9 | 78.9 | 62.6 |

From these results, it will be seen that, whilst bismuth hydroxide itself is substantially completely inactive, the catalyst comprising bismuth hydroxide on a calcium nickel phosphate support is considerably more active than calcium nickel phosphate itself.

Example 8

Two further catalysts were prepared using the calcium nickel phosphate of Tests Nos. 1 to 8 in Example 1, by mixing, in one case, 50 parts of the calcium nickel phos- TABLE 12.—OXIDATIVE DEHYDROGENATION (50% V/V O₂) OF BUTENE-1 USING A CALCIUM NICKEL PHOSPHATE (CNP) BISMUTH PHOSPHOTUNGSTATE (BPW) CATALYST

| Test No. | Catalyst Composition | | | Dehydrogenation temperature (percent) | | | | | | | | | | | |
|---|---|---|---|---|---|---|---|---|---|---|---|---|---|---|---|
| | | | | 550° C. | | | 600° C. | | | 625° C. | | | 650° C. | | |
| | CNP | BPW | Cr₂O₃ | C | S | Y | C | S | Y | C | S | Y | C | S | Y |
| 37 | 50 | 50 | 2 | | | | 67.9 | 89.4 | 60.7 | | | | | | |
| 38 | 50 | 50 | 2 | | | | 65.7 | 89.1 | 58.5 | | | | | | |
| 39 | 50 | 50 | 2 | | | | | | | | | | 85.0 | 75.6 | 64.3 |
| 40 | 50 | 50 | 2 | 57.2 | 91.4 | 52.3 | 70.3 | 90.8 | 63.8 | 72.4 | 87.9 | 63.3 | 77.3 | 90.2 | 69.7 |
| Means | 50 | 50 | 2 | 57 | 91 | 52 | 68 | 90 | 61 | 72 | 88 | 64 | 81 | 83 | 67 |
| Means | 100 | 0 | 2 | 37 | 87 | 32 | 54 | 86 | 46 | 63 | 87 | 55 | 71 | 85 | 61 |

From these results, it will be seen that the bismuth phosphotungstate catalyst has considerable activity, even at temperatures at which the calcium nickel phosphate is relatively inactive.

Example 7

A further catalyst was prepared using the calcium nickel phosphate of Tests Nos. 1 to 8 in Example 1 by phate with 50 parts of bismuth sulfate, and, in the other case, 75 parts of the calcium nickel phosphate with 25 parts of bismuth chloride. In each case, the 2 parts of graphite and the 2 parts of chromic oxide were included. The activities of these catalysts were determined generally as described in Example 1 in the absence of oxygen and the results obtained are shown in Table 15.

TABLE 15.—NON-OXIDATIVE DEHYDROGENATION OF BUTENE-1 USING A BISMUTH SULFATE/CALCIUM NICKEL PHOSPHATE (CNP) CATALYST AND A BISMUTH CHLORIDE/CALCIUM NICKEL PHOSPHATE CATALYST

| Test No. | Catalyst Composition | | | | Dehydrogenation temperature, (percent) | | | | | |
|---|---|---|---|---|---|---|---|---|---|---|
| | | | | | 600° C. | | | 625° C. | | |
| | CNP | Bi₂(SO₄)₃ | BiCl₃ | Cr₂O₃ | C | S | Y | C | S | Y |
| 44 | 50 | 50 | 0 | 2 | 63.8 | 87.5 | 55.8 | 72.2 | 84.7 | 61.1 |
| 45 | 50 | 0 | 50 | 2 | 27.3 | 96.0 | 26.2 | 49.6 | 86.3 | 42.5 |

From these results, it will be seen that active dehydrogenation catalysts can be prepared, in accordance with the present invention, using bismuth sulfate and bismuth chloride.

What is claimed is:

1. A hydrocarbon dehydrogenation catalyst comprising at least one bismuth compound selected from the group consisting of bismuth oxide, bismuth hydroxide, bismuth phosphate, bismuth sulfate, bismuth chloride, bismuth phosphotungstate and bismuth phosphomolybdate, on a calcium nickel phosphate support of which at least 60% of the total pore volume is contributed by pores having diameters in the range of from 1000 to 8000 Angstrom units (A.), the bismuth compound or compounds comprising from 1–80% by weight of the total catalyst.

2. A catalyst according to claim 1 in which at least 80% of the total pore volume of the support is contributed by pores having diameters in the range of from 1000 to 8000 A.

3. A catalyst according to claim 2 in which at least 90% of the total pore volume of the support is contributed by pores having diameters in the range of from 2000 to 6000 A.

4. A hydrocarbon dehydrogenation catalyst comprising at least one bismuth compound selected from the group consisting of bismuth oxide, bismuth hydroxide, bismuth phosphate, bismuth sulfate, bismuth chloride, bismuth phosphotungstate and bismuth phosphomolybdate, on a calcium nickel phosphate support having a Ca:Ni atomic ratio of from 7.5:1 to 9.2:1, and in which at least 80% of the total pore volume is contributed by pores having diameters in the range of from 1000 to 8000 A., the bismuth compound or compounds comprising from 5–60% by weight of the total catalyst.

5. A catalyst according to claim 4 in which at least 90% of the total pore volume is contributed by pores having diameters in the range of from 2000 to 6000 A., and in which the bismuth compound comprises from 20–60% by weight of the total catalyst.

6. A catalyst according to claim 4 wherein the bismuth compound is bismuth oxide.

7. A catalyst according to claim 4 in which from 0.5 to 5% by weight of chromic oxide is additionally incorporated.

8. A process for the dehydrogenation of a hydrocarbon feed comprising at least one hydrocarbon selected from the group consisting of aliphatic monoolefins having at least four carbon atoms in their unsaturated carbon chains, alkylated aromatic hydrocarbons having at least two carbon atoms in their alky groups, cycloaliphatic olefins having five to eight carbon atoms in their olefinically unsaturated rings and cycloalkanes having five to seven carbon atoms, which process comprises effecting the dehydrogenation in the presence of a catalyst comprising at least one bismuth compound selected from the group consisting of bismuth oxide, bismuth hydroxide, bismuth phosphate, bismuth sulfate, bismuth chloride, bismuth phosphotungstate and bismuth phosphomolybdate, on a calcium nickel phosphate support of which at least 60% of the total pore volume is contributed by pores having diameters in the range of from 1000 to 8000 A., the bismuth compound or compounds comprising from 1–80% by weight of the total catalyst.

9. A process according to claim 8 in which the catalyst contains from 5–60% by weight of the bismuth compound or compounds and in which at least 80% of the total pore volume of the catalyst support is contributed by pores having diameters in the range of from 1000 to 8000 A.

10. A process according to claim 9 in which the dehydrogenation is effected in the presence of steam and at temperatures between 500 and 750° C.

11. A process according to claim 10 which comprises effecting the dehydrogenation in the presence of oxygen.

12. A process according to claim 10 which comprises effecting the dehydrogenation in the presence of from 10–25 volumes of steam per volume of hydrocarbon and at a temperature between 500 to 650° C.

13. A process according to claim 9 in which the catalyst support comprises a calcium nickel phosphate having a Ca:Ni atomic ratio of from 7.5:1 to 9.2:1 and in which at least 90% of the total pore volume of the calcium nickel phosphate support is contributed by pores having diameters in the range of from 2000 to 6000 A.

14. A process according to claim 13 in which the catalyst also contains from 0.5 to 5% by weight of chromic oxide.

15. A process for the dehydrogenation of a hydrocarbon feed comprising at least one hydrocarbon selected from aliphatic monoolefins having four to six carbon atoms in their unsaturated carbon chains, alkylated aromatic hydrocarbons having two to four carbon atoms in their alkyl groups, cycloaliphatic olefins having five to eight carbon atoms in their olefinically unsaturated rings, and cycloalkanes having five to seven carbon atoms, which process comprises effecting the dehydrogenation at temperatures of from 500 to 750° C., and in the presence of steam and a catalyst comprising a bismuth compound selected from bismuth oxide, bismuth hydroxide, bismuth phosphate, bismuth sulfate, bismuth chloride, bismuth phosphotungstate and bismuth phosphomolybdate, and a calcium nickel phosphate support, at least 60% of the total pore volume of said calcium nickel phosphate support being contributed by pores having diameters in the range of from 1000 to 8000 A., and the bismuth compound comprising from 5–60% by weight of the total catalyst.

16. A process according to claim 15 for the dehydrogenation of a hydrocarbon feed comprising at least one n-butene, which process is effected at temperatures between 500 and 650° C. in the presence of from 10–25 volumes of steam per volume of hydrocarbon and in which the calcium nickel phosphate support has a Ca:Ni atomic ratio of from 7.5:1 to 9.2:1.

17. A process according to claim 16 in which the catalyst contains from 20–60% by weight of a bismuth compound selected from bismuth oxide, bismuth phosphate and bismuth phosphomolybdate and in which at least 90% of the total pore volume of the catalyst support is contributed by pores having diameters in the range of from 2000 to 6000 A.

18. A process according to claim 17 in which the catalyst also contains from 0.5 to 5% by weight of chromic oxide.

19. A process of preparing a dehydrogenation catalyst which comprises the steps of (a) precipitating a calcium nickel phosphate by mixing an aqueous solution of an alkali with an aqueous solution containing calcium ions and nickel ions, one of which solution contains phosphate ions, (b) separating the precipitated material from the precipitation medium, (c) drying the resultant material and (d) mixing the calcium nickel phosphate so formed with a bismuth compound selected from the group consisting of bismuth oxide, bismuth hydroxide, bismuth phosphate, bismuth sulfate, bismuth chloride, bismuth phosphotungstate and bismuth phosphomolybdate, in an amount such that the bismuth compound comprises from 5–60% by weight of the total catalyst.

20. A process according to claim 19 wherein said precipitation takes place at a pH of from 7.5 to 8.3.

21. A process of preparing a dehydrogenation catalyst which comprises the steps of (a) coprecipitating a calcium nickel phosphate and bismuth phosphate by mixing an aqueous solution of an alkali with an aqueous solution containing calcium ions, nickel ions, and bismuth ions, one of which solution contains phosphate ions, (b) separating the precipitated material from the precipitation medium, and (c) drying the resultant material, the amount of bismuth phosphate in the catalyst composition being up to 5% by weight of the total catalyst composition.

References Cited
UNITED STATES PATENTS

| | | | |
|---|---|---|---|
| 2,408,139 | 9/1946 | Gutzeit | 260—680 |
| 2,945,900 | 7/1960 | Alexander et al. | 260—680 X |
| 2,991,321 | 7/1961 | Voge et al. | 260—680 |
| 3,320,330 | 5/1967 | Callahan et al. | 260—680 |

PAUL M. COUGHLAN, JR., *Primary Examiner.*